United States Patent
Oya et al.

(10) Patent No.: US 11,705,567 B2
(45) Date of Patent: Jul. 18, 2023

(54) FUEL CELL SYSTEM, NON-TRANSITORY STORAGE MEDIUM AND CONTROL METHOD FOR FUEL CELL SYSTEM

(71) Applicant: TOYOTA JIDOSHA KABUSHIKI KAISHA, Toyota (JP)

(72) Inventors: Ryosuke Oya, Toyota (JP); Kotomi Fujinaga, Anjo (JP); Shinobu Otsuka, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 17/198,398

(22) Filed: Mar. 11, 2021

(65) Prior Publication Data

US 2021/0351424 A1    Nov. 11, 2021

(30) Foreign Application Priority Data

May 11, 2020    (JP) ................................. 2020-083063

(51) Int. Cl.
*H01M 8/04858*    (2016.01)
*H01M 8/04537*    (2016.01)
(Continued)

(52) U.S. Cl.
CPC ......... *H01M 8/04947* (2013.01); *B60L 1/003* (2013.01); *B60L 58/40* (2019.02); *H01M 8/04567* (2013.01); *B60L 2210/14* (2013.01); *B60L 2240/547* (2013.01); *H01M 2250/20* (2013.01)

(58) Field of Classification Search
CPC ......... H91M 8/04947; H91M 8/04567; H91M 2250/20; B60L 1/003; B60L 58/40; B60L 2210/14; B60L 2240/547; H01M 8/04947; H01M 8/04567; H01M 2250/20
See application file for complete search history.

(56) References Cited

U.S. PATENT DOCUMENTS

2013/0338867 A1*  12/2013  Sato ..................... B60W 30/192
                                                        903/903
2014/0132193 A1*  5/2014   Kajiwara ................ B60L 50/51
                                                        318/500
(Continued)

FOREIGN PATENT DOCUMENTS

JP      2018181834 A    11/2018
WO      2012/124070 A1   9/2012

*Primary Examiner* — Adam A Arciero
(74) *Attorney, Agent, or Firm* — Dickinson Wright, PLLC

(57) ABSTRACT

A fuel cell system has a first boost converter of a fuel cell, a second boost converter of a secondary battery, and a control unit. Output sides of the first boost converter and the second boost converter are connected so as to be the same potential. The control unit is configured to, when detecting failure of the second boost converter, cause input and output sides of the second boost converter to conduct, estimate an open circuit voltage of the secondary battery based on a state of charge, and execute electric power consumption by an accessory that operates by electric power supplied from the fuel cell when determining that the first boost converter is not able to boost the output voltage of the fuel cell to the open circuit voltage, and stops the electric power consumption by the accessory when determining that the first boost converter is able to boost.

7 Claims, 6 Drawing Sheets

(51) Int. Cl.
*B60L 58/40* (2019.01)
*B60L 1/00* (2006.01)

(56) References Cited

U.S. PATENT DOCUMENTS

2014/0333316 A1\* 11/2014 Toida ................. H01M 8/0488
    324/426
2018/0290559 A1\* 10/2018 Oya ........................ B60L 58/40

\* cited by examiner

FUEL CELL SYSTEM, NON-TRANSITORY STORAGE MEDIUM AND CONTROL METHOD FOR FUEL CELL SYSTEM

CROSS-REFERENCE TO RELATED APPLICATION

This application claims priority to Japanese Patent Application No. 2020-083063 filed on May 11, 2020, incorporated herein by reference in its entirety.

BACKGROUND

1. Technical Field

The disclosure relates to a fuel cell system, and a non-transitory storage medium and a control method for the fuel cell system.

2. Description of Related Art

There is technology known regarding a vehicle that travels under supply of electric power from a fuel cell and a secondary battery, in which, when a boost converter that boosts output voltage of the secondary battery fails, the vehicle continues traveling by placing this boost converter in a conducting state (see Japanese Unexamined Patent Application Publication No. 2018-181834 (JP 2018-181834 A), for example).

In a fuel cell system in which electric power is supplied from a fuel cell and a secondary battery to a traction motor or the like, the output side of a boost converter that boosts output voltage of the fuel cell and the output side of a boost converter that boosts output voltage of the secondary battery are often connected so as to be the same potential as each other. There also is demand for maintaining the fuel cell in a generating state even when the boost converter of the secondary battery fails. Accordingly, control is sometimes performed in which, when the boost converter of the secondary battery is placed in a conducting state and the open circuit voltages of the secondary battery and the fuel cell are close, an accessory is caused to consume electric power to lower the output of the fuel cell, to maintain a boost ratio at which the boost converter of the fuel cell is able to operate stably.

SUMMARY

However, causing the accessory to consume a great amount of electric power reduces the traveling distance of the vehicle thereafter.

The disclosure provides a fuel cell system and so forth for a vehicle that travels under supply of electric power from a fuel cell and a secondary battery, which is able to travel farther even when a boost converter that boosts the output voltage of the secondary battery fails.

A fuel cell system according to a first aspect of the disclosure includes a fuel cell, a secondary battery as electric power supply sources for a load, a first boost converter that boosts and outputs output voltage of the fuel cell, a second boost converter that boosts and outputs output voltage of the secondary battery, and a control unit configured to control the fuel cell system. An output side of the first boost converter and an output side of the second boost converter are connected so as to be the same potential as each other. The control unit is configured to, when detecting failure of the second boost converter, cause an input side and the output side of the second boost converter to conduct, estimate an open circuit voltage of the secondary battery based on a state of charge, and execute electric power consumption by an accessory that operates by electric power supplied from the fuel cell when determining that the first boost converter is not able to boost the output voltage of the fuel cell to the open circuit voltage of the secondary battery, and stops electric power consumption by the accessory when determining that the first boost converter is able to boost the output voltage of the fuel cell to the open circuit voltage of the secondary battery.

According to the fuel cell system configured in this way, electric power consumption by the accessory can be suppressed, and accordingly the vehicle that travels by this fuel cell system is able to travel farther.

In the above fuel cell system, the control unit may use the open circuit voltage of the fuel cell as the output voltage of the fuel cell. The output of the fuel cell is constantly changing due to electric power consumption by loads connected to the fuel cell. Accordingly, by using the open circuit voltage of the fuel cell that is the largest voltage at that point in time as a reference for the output of the fuel cell system, the boost converter of the fuel cell can be made to operate more stably.

Also, the control unit may determine that the first boost converter is not able to boost the output voltage of the fuel cell, when the open circuit voltage of the secondary battery is smaller than a value obtained multiplying the output voltage of the fuel cell by a minimum boost ratio at which operation of the first boost converter is guaranteed. The minimum boost ratio at which operation of each boost converter is guaranteed is set, and accordingly, the boost converter of the fuel cell can be operated more stably by using this value.

Also, the control unit may stop supply of air to the fuel cell and continue supply of fuel gas, when determining that the first boost converter is not able to boost the output voltage of the fuel cell to the open circuit voltage of the secondary battery. The fuel cell can be maintained in a state of generating electricity as long as supply of fuel gas is continued, and also lowering of the output voltage of the fuel cell by stopping the supply of air can be anticipated.

At this time, the control unit may measure the output voltage of the fuel cell after a predetermined amount of time has elapsed following stopping supply of air to the fuel cell, and stop generating of electricity by the fuel cell, when determining that the first boost converter is not able to boost the output voltage of the fuel cell to the open circuit voltage of the secondary battery. According to such control, both maintaining the state of the fuel cell generating electricity as long as possible, and stable supply of electric power from the fuel cell system, can be realized.

A control method for a fuel cell system according to a second aspect of the disclosure is a control method for a fuel cell system provided with a fuel cell and a secondary battery as electric power supply sources for a load, in which output sides of each of a first boost converter that boosts and outputs output voltage of the fuel cell and a second boost converter that boosts and outputs output voltage of the secondary battery are connected so as to be the same potential as each other. The control method includes detecting failure of the second boost converter, causing an input side and the output side of the second boost converter to conduct when detecting failure of the second boost converter, estimating an open circuit voltage of the secondary battery based on a state of charge, determining whether the first boost converter is able to boost the output voltage of the fuel cell to the open circuit voltage of the secondary battery, executing electric power consumption by an accessory that operates by electric power supplied from the fuel cell when determination is made that the first boost converter is not able to boost the output voltage of the fuel cell to the open circuit voltage, and stopping electric power consumption by the accessory when determination is made that the first boost converter is able to boost the output voltage of the fuel cell to the open circuit voltage.

A non-transitory storage medium storing a control program for a fuel cell system is provided according to a third aspect of the disclosure. The fuel cell system is provided with a fuel cell and a secondary battery as electric power supply sources for a load, in which output sides of each of a first boost converter that boosts and outputs output voltage of the fuel cell and a second boost converter that boosts and outputs output voltage of the secondary battery are connected so as to be the same potential as each other. The control program causes a computer to execute detecting failure of the second boost converter, causing an input side and the output side of the second boost converter to conduct when detecting failure of the second boost converter, estimating an open circuit voltage of the secondary battery based on a state of charge, determining whether the first boost converter is able to boost the output voltage of the fuel cell to the open circuit voltage of the secondary battery, executing electric power consumption by an accessory that operates by electric power supplied from the fuel cell when determination is made that the first boost converter is not able to boost the output voltage of the fuel cell to the open circuit voltage, and stopping electric power consumption by the accessory when determination is made that the first boost converter is able to boost the output voltage of the fuel cell to the open circuit voltage.

According to the fuel cell system controlled by such a control method and a non-transitory storage medium, electric power consumption by the accessory can be suppressed, and accordingly the vehicle that travels by this fuel cell system is able to travel farther even after the boost converter that boosts output voltage of the secondary battery fails.

According to the disclosure, a fuel cell system and so forth for a vehicle that travels under supply of electric power from a fuel cell and a secondary battery can be provided in which the vehicle is able to travel farther even when the boost converter that boosts the output voltage of the secondary battery fails.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Although the disclosure will be described below by way of an embodiment of the disclosure, the disclosure is not limited to the following embodiment. It should also be noted that not all configurations described in the embodiment are indispensable to means for solving the object.

Figure 1:
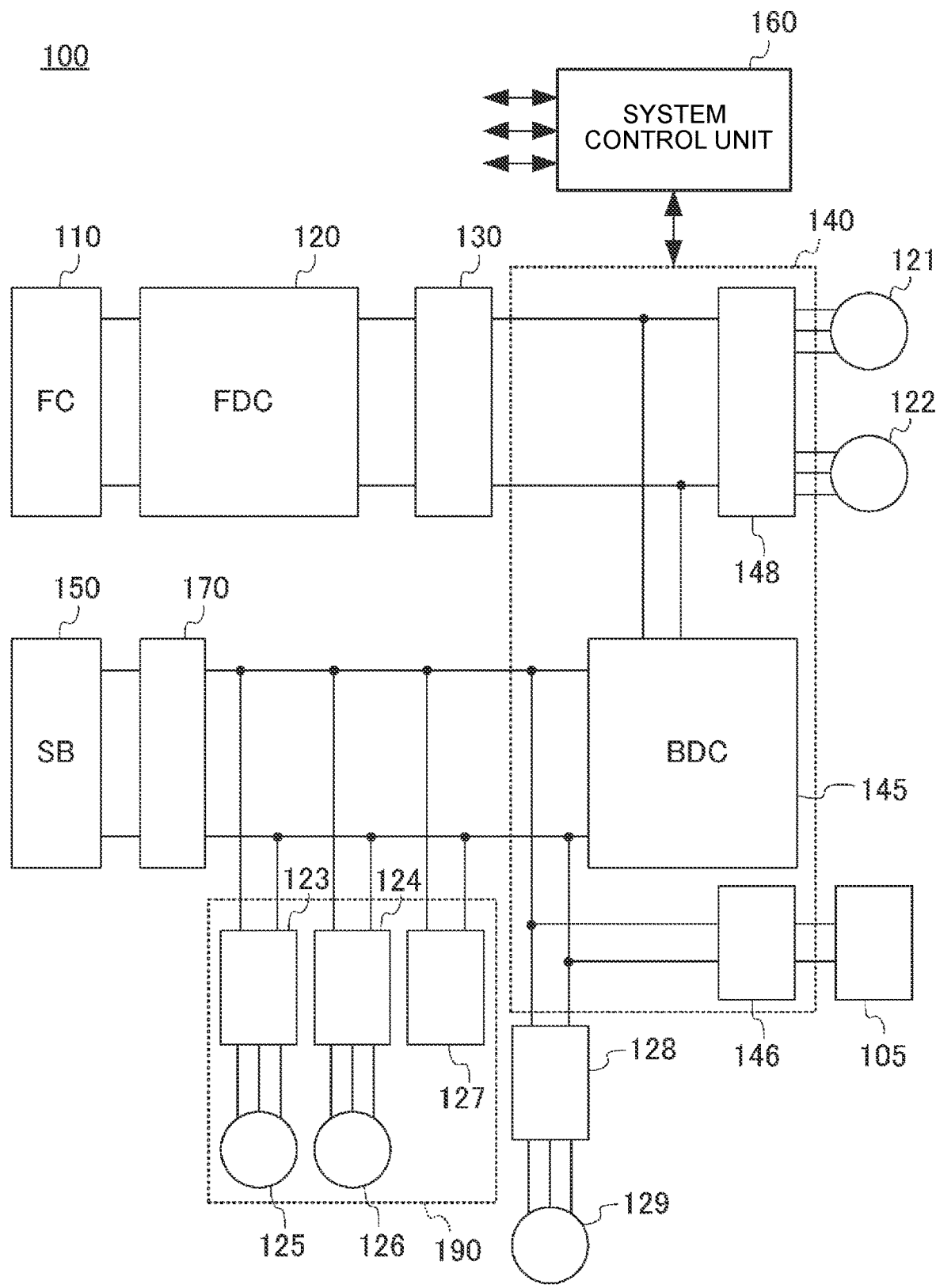
FIG. 1 is a system configuration diagram of a fuel cell system according to an embodiment.

FIG. 1 is a system configuration diagram of a fuel cell system 100 according to the present embodiment. The fuel cell system 100 is provided with a fuel cell (FC) 110, an FC boost converter (FC DC-DC converter (FDC)) 120, an FC relay circuit 130, a power control unit (PCU) 140, a secondary battery (SB) 150, a system control unit 160, an SB relay circuit 170, and an adjusting accessory device 190, as illustrated in FIG. 1.

The fuel cell 110 is a cell that generates electricity by a reaction between hydrogen and oxygen, which are reactant gasses. A vehicle in which the fuel cell system 100 is installed has a hydrogen tank (omitted from illustration) in which hydrogen (fuel gas) as a reactant gas is stored. The hydrogen tank supplies hydrogen stored therein to the fuel cell 110. An air compressor 121 compresses air in the atmosphere, and supplies air containing oxygen (oxidizing gas) as a reactant gas to the fuel cell 110.

The FC boost converter 120 is a boost converter that boosts the voltage output by the fuel cell 110 to the driving voltage of the air compressor 121 and a traction motor 122. The FC boost converter 120 boosts the output voltage of the fuel cell 110, in other words the input voltage of the FC boost converter 120, in accordance with a boost ratio specified by control signals received from the system control unit 160, and outputs the boosted voltage.

The FC relay circuit 130 is a circuit that opens and closes electrical connection between the FC boost converter 120 and the PCU 140. Accordingly, the FC relay circuit 130 is disposed between the FC boost converter 120 and the PCU 140.

The PCU 140 adjusts the amount of electric power to be transmitted to a load within the fuel cell system 100 and an external load connected to the fuel cell system 100, in accordance with control signals sent from the system control unit 160. The PCU 140 has an SB boost converter (bidirectional DC-DC converter (BDC)) 145, a DC-DC converter 146, and an intelligent power module (IPM) 148.

The SB boost converter 145 is a boost converter that boosts the voltage output by the secondary battery 150 to the driving voltage of the air compressor 121 and the traction motor 122. The SB boost converter 145 boosts the output voltage of the secondary battery 150, in other words the input voltage of the SB boost converter 145, in accordance with a boost ratio specified by control signals received from the system control unit 160, and outputs the boosted voltage. That is to say, when the FC relay circuit 130 is closed, the output voltage of the FC boost converter 120 is transmitted to the PCU 140 without change, and accordingly it can be said that the output side of the FC boost converter 120 and the output side of the SB boost converter 145 are connected so as to be the same potential as each other. The input side and the output side of the SB boost converter 145 may be short-circuited by a control signal sent from the system control unit 160 so as to conduct.

The system control unit 160 determines that a failure has occurred when output of a sensor monitoring high-voltage circuits around the traction motor 122 yields an abnormal value, or when output of a sensor monitoring input/output voltage of the SB boost converter 145 yields an abnormal value, for example. In particular, when detecting that the output voltage of the SB boost converter 145 as to the input voltage thereof is not realizing the boost ratio specified by the system control unit 160, determination is made that the SB boost converter 145 has failed.

The IPM 148 is a power module connected to the air compressor 121 and the traction motor 122, which are electrical loads. The traction motor 122 is a motor that drives the tires of the vehicle in which the fuel cell system 100 is installed, causing the vehicle to travel. The traction motor 122 is driven by electric power supplied from at least one of the fuel cell 110 and the secondary battery 150.

The secondary battery 150 is a battery that temporarily stores electric power obtained by the fuel cell 110 generating electricity and regenerative electric power from the traction motor 122. The secondary battery 150 is a lithium-ion battery, for example. Electric power stored in the secondary battery 150 is supplied to a load within the fuel cell system 100 and an external load connected to the fuel cell system 100.

The SB relay circuit 170 is a circuit that opens and closes electrical connection between the secondary battery 150 and the PCU 140. Accordingly, the SB relay circuit 170 is disposed between the secondary battery 150 and the PCU 140.

The adjusting accessory device 190 is a device that is able to consume electric power generated at the fuel cell 110, and includes, for example, accessory motors 125 and 126, accessory inverters 123 and 124, and a heater 127. The accessory motor 125 is a motor that drives a hydrogen pump that causes reflux flow of hydrogen off-gas discharged from a hydrogen gas channel of the fuel cell 110 to the fuel cell 110. The accessory motor 126 is a motor that drives a coolant pump for circulating coolant used for temperature adjustment of the fuel cell 110. The accessory inverters 123 and 124 each convert direct current electric current into three-phase alternating current and supply the three-phase alternating current to the accessory motors 125 and 126. The heater 127 is a heater for heating stored water when warm water is necessary. The adjusting accessory device 190 is an accessory that executes electric power consumption to lower the output voltage of the fuel cell 110, which will be described later. The adjusting accessory device 190 is not limited to the above-described accessories, and inclusion of an accessory that is able to execute electric power consumption is sufficient.

The fuel cell system 100 may be provided with accessories such as an accessory inverter 128, an air conditioner 129, and so forth, besides the accessories included in the adjusting accessory device 190. An accessory battery 105 is a battery for accessories, which temporarily stores electric power supplied from the secondary battery 150, and is connected to a circuit of the secondary battery 150 via a DC-DC converter 146. Electric power stored in the accessory battery 105 is supplied to the accessories in accordance with requests from the system control unit 160.

The system control unit 160 is a computer system that controls operations of the elements configuring the fuel cell system 100. The system control unit 160 is configured of, for example, a central processing unit (CPU), random access memory (RAM), read-only memory (ROM), an input/output interface, and so forth. Communication equipment that exchanges information with external equipment may be included. The system control unit 160 receives output signals sent from various types of sensors (e.g., signals representing throttle valve opening degree, signals representing vehicle speed, signals representing output current and output voltage of the fuel cell 110, and so forth), and computes the amount of electric power to be output to each load, such as the traction motor 122 and so forth.

Figure 2:
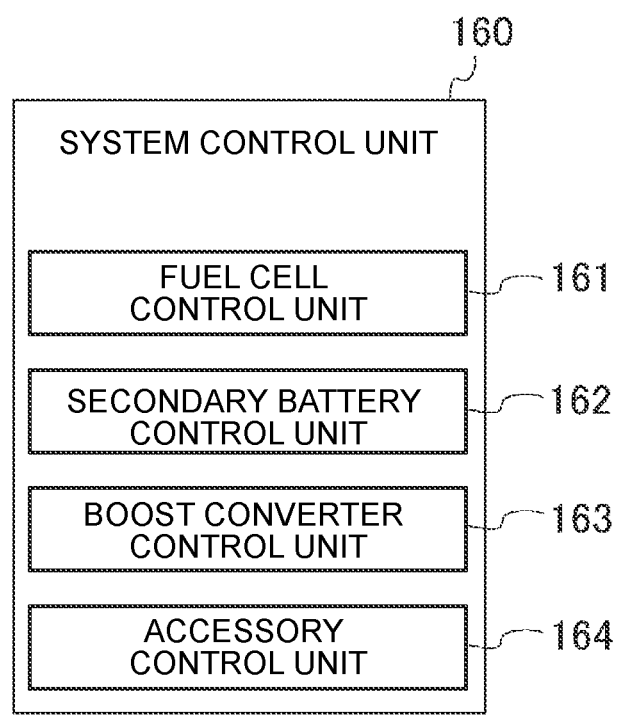
FIG. 2 is a block diagram illustrating a configuration of a system control unit.

FIG. 2 is a block diagram illustrating the configuration of the system control unit 160. The system control unit 160 also has a role of a function control unit that executes various types of control in accordance with processing instructed by a control program. The system control unit 160 may function as a fuel cell control unit 161, a secondary battery control unit 162, a boost converter control unit 163, and an accessory control unit 164.

The fuel cell control unit 161 controls generation of electricity by the fuel cell 110 by controlling opening and closing of valves adjusting the amount of fuel gas supplied, and controlling the air compressor 121 that adjusts the amount of air supplied. The fuel cell control unit 161 also receives output signals from a voltage sensor provided to the fuel cell 110 and monitors output voltage Vf of the fuel cell 110.

The secondary battery control unit 162 controls discharging and charging of the secondary battery 150 by opening and closing the connection at the SB relay circuit 170. The secondary battery control unit 162 also receives output signals from a voltage sensor provided to the secondary battery 150, and monitors output voltage Vb of the secondary battery 150. Further, the secondary battery control unit 162 integrates discharged electric power and charged electric power to identify the state of charge (SOC) of the secondary battery 150. The secondary battery control unit 162 moreover fits the identified SOC on a charge/discharge curve that is stored, thereby estimating the open circuit voltage Vbm of the secondary battery 150 at that point in time, which will be described later.

The boost converter control unit 163 controls boosting by the FC boost converter 120 and boosting by the SB boost converter 145. Specifically, the boost converter control unit 163 calculates a boost ratio Rf for the FC boost converter 120 in order to boost the output voltage Vf of the fuel cell 110 to the voltage Vt that is necessary for the traction motor 122, for example, and transmits a control signal thereof to the FC boost converter 120. In the same way, the boost converter control unit 163 calculates a boost ratio Rs for the SB boost converter 145 in order to boost the output voltage Vb of the secondary battery 150 to Vt, and transmits a control signal thereof to the SB boost converter 145. The boost converter control unit 163 also monitors the input voltage and the output voltage of the SB boost converter 145, and detects, from the results of monitoring, whether the specified boost ratio Rs is realized. When detection is made that the specified boost ratio Rs is not realized, the boost converter control unit 163 determines that the SB boost converter 145 has failed. At this time, a control signal for conducting between the input side and the output side is transmitted to the SB boost converter 145.

The accessory control unit 164 controls operation and stopping of the accessories. For example, when an instruction is received from the fuel cell control unit 161 for reflux flow of hydrogen off-gas to the fuel cell 110, the accessory control unit 164 runs the accessory motor 125. Also, when an instruction for electric power consumption by an accessory is received from the boost converter control unit 163, the boost converter control unit 163 selects an accessory from the accessories of the adjusting accessory device 190 that is able to realize the electric power consumption that is instructed, and causes this accessory to execute the electric power consumption, which will be described in detail later.

Figure 3:
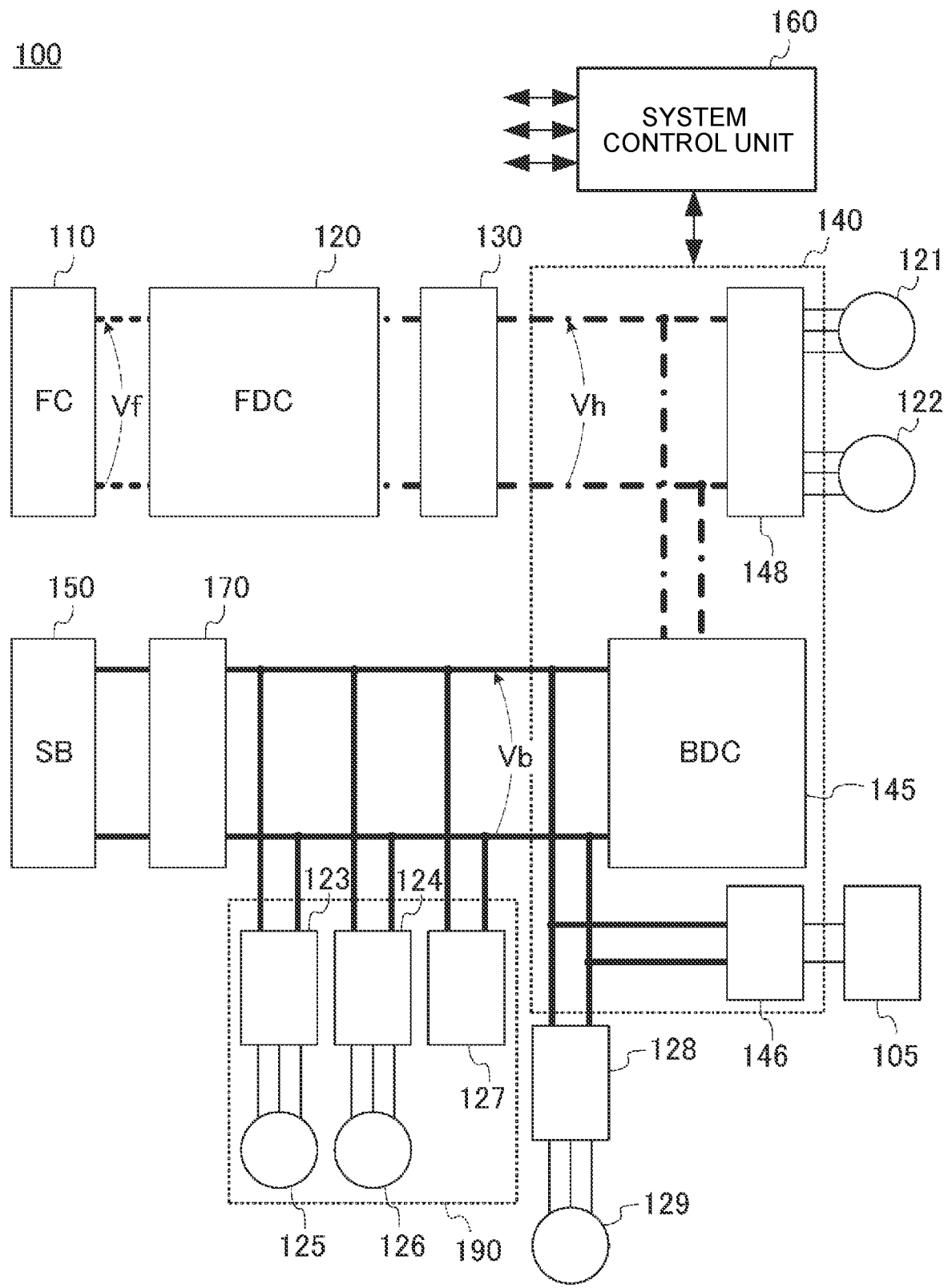
FIG. 3 is a diagram for describing a voltage state of the fuel cell system in normal operations.

FIG. 3 is a diagram for describing a voltage state of the fuel cell system 100 in normal operations. In normal operations, when the output voltage of the secondary battery 150 is Vb, the input voltage of the SB boost converter 145 is also Vb, and the voltage supplied to the adjusting accessory device 190 and so forth is also Vb, as indicated by thick lines in FIG. 3.

Assuming that the drive voltage of the traction motor 122 and so forth, requested by the IPM 148, is Vh, the SB boost converter 145 boosts the input voltage Vb to Vh in accordance with control of the boost converter control unit 163, and outputs the boosted voltage. The boost ratio Rs of the SB boost converter 145 at this time that is instructed by the boost converter control unit 163 is Vh/Vb. The long dashed short dashed lines in FIG. 3 represent wiring for the voltage Vh.

In the same way, when the output voltage of the fuel cell 110 is Vf, the input voltage of the FC boost converter 120 is also Vf, as indicated by the dashed lines in FIG. 3. The output side of the FC boost converter 120 is connected with the same potential as the input side of the IPM 148 via the FC relay circuit 130, and accordingly the FC boost converter 120 boosts the input voltage Vf to Vh in accordance with control of the boost converter control unit 163, and outputs the boosted voltage. The boost ratio Rf of the FC boost converter 120 at this time that is instructed by the boost converter control unit 163 is Vh/Vf. Note that the fuel cell system 100 is designed so that in normal operations, the boost ratio Rs is decided within a range regarding which normal operations of the SB boost converter 145 are guaranteed. In the same way, the fuel cell system 100 is designed so that the boost ratio Rf is decided within a range regarding which normal operations of the FC boost converter 120 are guaranteed.

Figure 4:
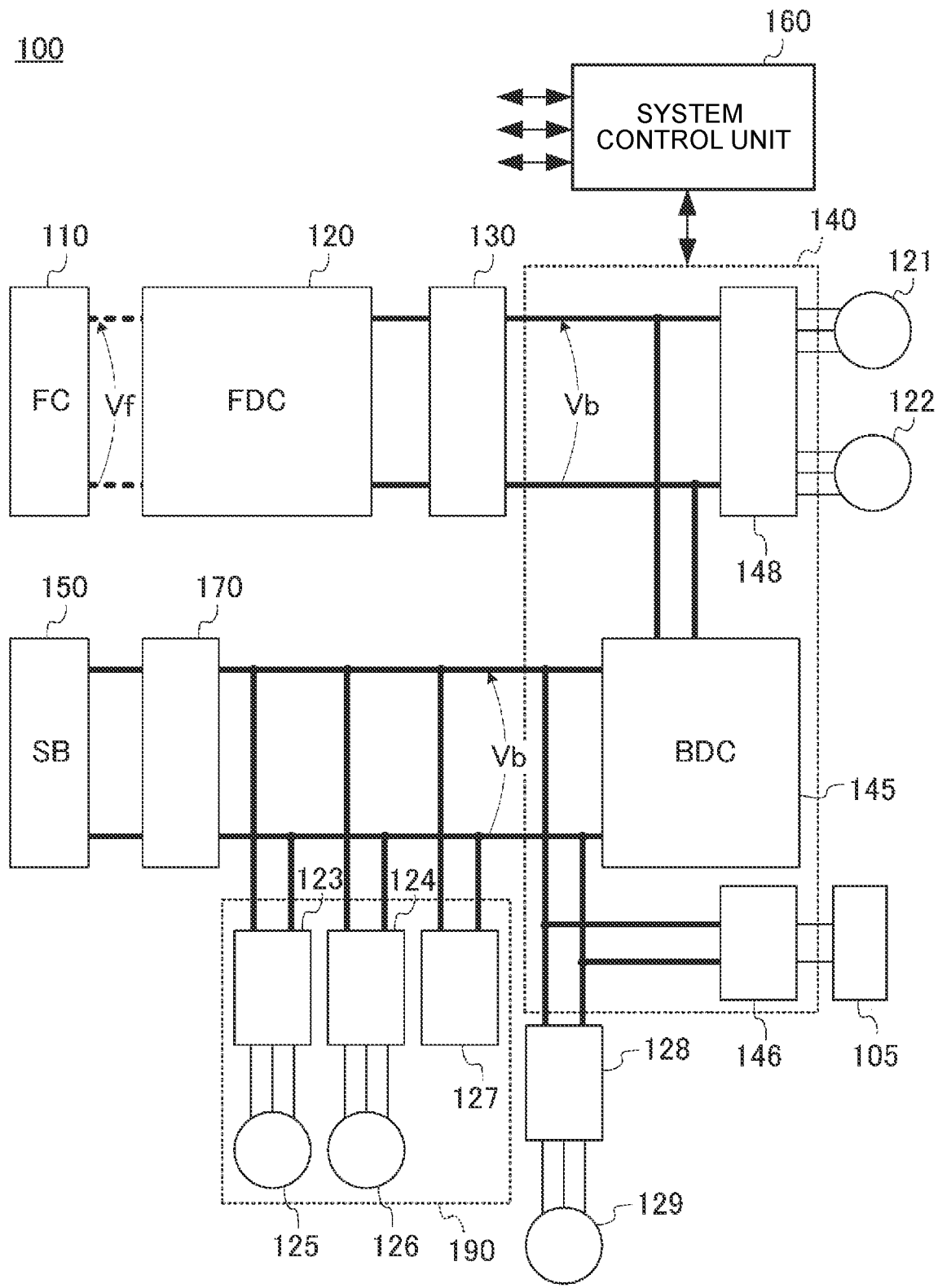
FIG. 4 is a diagram for describing a voltage state of the fuel cell system when an abnormality occurs.

FIG. 4 is a diagram for describing a voltage state of the fuel cell system 100 when an abnormality occurs. The boost converter control unit 163 monitors the input voltage and the output voltage of the SB boost converter 145, and successively confirms whether the boost ratio is within a tolerance range regarding the specified boost ratio. When detecting that the boost ratio is not within the tolerance range, the boost converter control unit 163 determines that the SB boost converter 145 has failed. When determining that the SB boost converter 145 has failed, the boost converter control unit 163 short-circuits the input side and the output side of the SB boost converter 145 so as to conduct.

When the input side and the output side of the SB boost converter 145 are made to conduct, the voltage of the wiring connected to the output side of the SB boost converter 145 is also Vb, as indicated by thick lines in FIG. 4. At this time, Vb is equal to the output voltage of the secondary battery 150 and accordingly may be a value that is close to the output voltage Vf of the fuel cell 110 in some cases. A situation may occur in which the FC boost converter 120 attempts to boost Vf to Vb, but the boost ratio Rf thereof is lower than a minimum boost ratio $Rf_0$ that the FC boost converter 120 guarantees. The range over which boosting operations of the FC boost converter 120 are guaranteed is set in advance through experimentation or simulation, as a range in which output hunting (a phenomenon in which the duty ratio rises and falls) of the FC boost converter 120 does not occur, for example. The minimum boost ratio $Rf_0$ is the smallest value in this range.

Accordingly, in the present embodiment, when the boost converter control unit 163 detects failure of the SB boost converter 145, the secondary battery control unit 162 estimates the open circuit voltage Vbm of the secondary battery 150 based on the SOC. When the boost converter control unit 163 determines that the FC boost converter 120 is not able to boost the output voltage Vf of the fuel cell 110 to the open circuit voltage Vbm of the secondary battery 150, the accessory control unit 164 executes electric power consumption by an accessory of the adjusting accessory device 190 to lower the output voltage of the fuel cell 110. On the other hand, when the boost converter control unit 163 determines that boosting is able to be performed, the accessory control unit 164 stops or does not execute electric power consumption by an accessory of the adjusting accessory device 190, thereby suppressing unnecessary electric power consumption.

Figure 5:
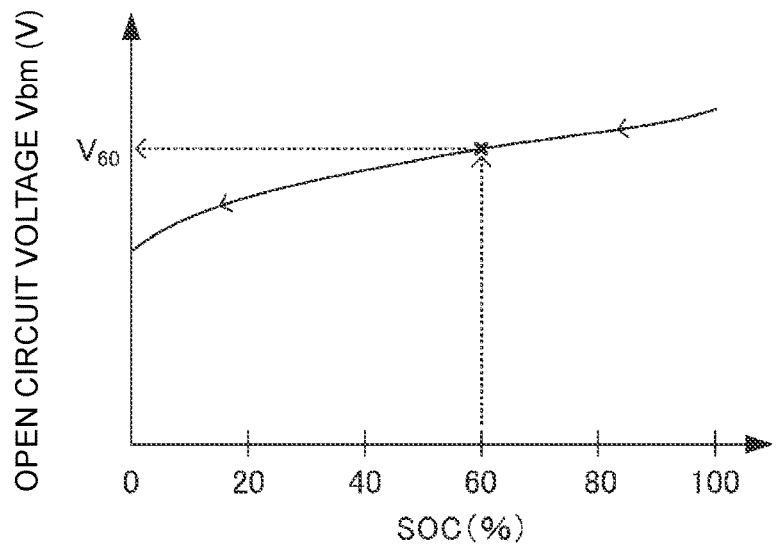
FIG. 5 is a diagram showing an example of a relation between state of charge (SOC) and open circuit voltage.

Estimation of the open circuit voltage Vbm by the secondary battery control unit 162 will be described. FIG. 5 is a diagram illustrating an example of a relation between SOC and open circuit voltage at the time of discharging of the secondary battery 150. The vertical axis represents open circuit voltage Vbm (V), and the horizontal axis represents the SOC, in which the specified fully-discharged state is 0%, and the fully-charged state is 100%.

As shown in FIG. 5, the secondary battery 150 (e.g., a lithium-ion battery) used in the present embodiment has a characteristic in that the open circuit voltage Vbm gradually decreases as the SOC drops. Such a characteristic curve can be acquired in advance as product information of the secondary battery.

The secondary battery control unit 162 monitors output signals of the voltage sensor and the current sensor over the period of the secondary battery 150 supplying electric power to the loads, and integrates the consumed electric power, thereby continuously identifying the amount of decrease in the SOC. The open circuit voltage Vbm is then estimated by referencing the characteristics curve shown in FIG. 5. For example, the open circuit voltage at the point in time regarding which the SOC is identified to be 60% at the current point in time is estimated to be $Vbm=V_{60}$ by following the dashed line arrows shown in FIG. 5.

Figure 6:
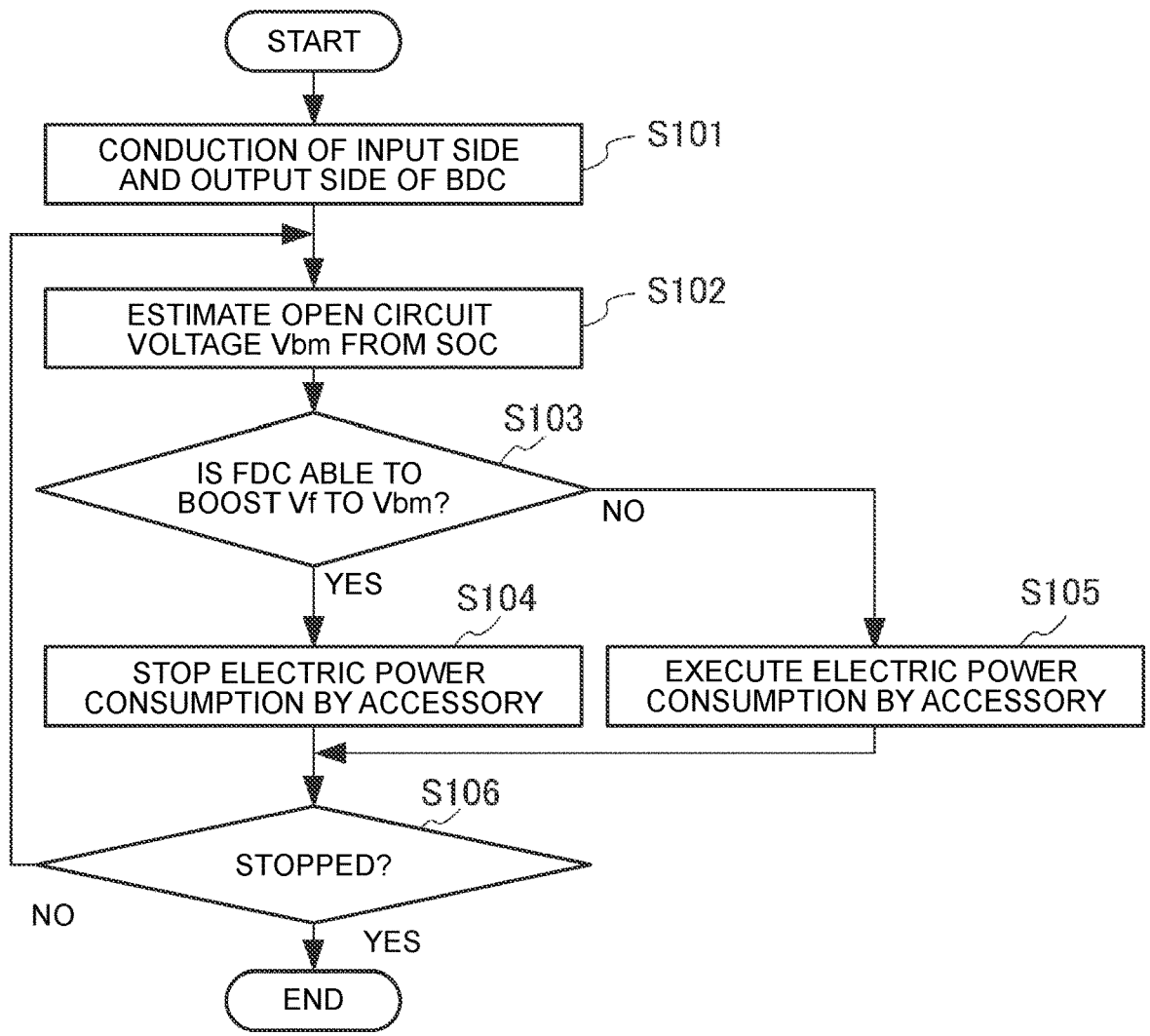
FIG. 6 is a flowchart showing an example of processing at the system control unit when an abnormality occurs.

The processing flow when detecting failure of the SB boost converter 145 will be described. FIG. 6 is a flowchart showing an example of processing executed by the system control unit 160 when the SB boost converter 145 fails. The flow starts from a point in time at which the boost converter control unit 163 detects failure of the SB boost converter 145 while the vehicle is traveling. Specifically, this is a point in time at which the SB boost converter 145 detects that the SB boost converter 145 is not able to realize the specified boost ratio, great fluctuations are observed in output voltage, or the like.

In step S101, the boost converter control unit 163 causes conduction of the input side and the output side of the SB boost converter 145. In the subsequent step S102, the secondary battery control unit 162 calculates the SOC at the current point in time from the consumed electric power that is consumed up to that point in time, references the SOC characteristics curve, and estimates the open circuit voltage Vbm of the secondary battery 150. In step S103, the boost converter control unit 163 receives the open circuit voltage Vbm from the secondary battery control unit 162, and also acquires the output voltage Vf of the fuel cell 110 from the voltage sensor provided to the fuel cell 110. The boost converter control unit 163 then determines whether the FC boost converter 120 is able to stably boost Vf to Vbm. Specifically, the boost converter control unit 163 determines whether the boost ratio Vbm/Vf is within a boost ratio range in which the FC boost converter 120 is guaranteed to operate. In other words, the boost converter control unit 163 determines that the FC boost converter 120 is not able to boost when Vbm is smaller than a value obtained by multiplying Vf by the minimum boost ratio $Rf_0$.

Now, the Vf used for computation preferably is the open circuit voltage Vfm of the fuel cell 110. The output voltage Vf of the fuel cell 110 is constantly changing due to electric power consumption by loads connected to the fuel cell system 100. Accordingly, by using the open circuit voltage Vfm that is the largest voltage at that point in time as a reference for the output voltage Vf of the fuel cell 110, the boost ratio is a smallest value, and accordingly whether the FC boost converter 120 is able to continuously stably operate even though the output voltage Vf changes can be determined.

When the boost converter control unit 163 determines that boosting is able to be performed, the flow advances to step S104, and when determining that boosting is not able to be performed, the flow advances to step S105. When advancing to step S104, the boost converter control unit 163 sets the FC boost converter 120 to the boost ratio that boosts Vf to Vb. When a situation occurs in which the boost ratio that boosts Vf to Vb is smaller than the minimum boost ratio $Rf_0$, the minimum boost ratio $Rf_0$ may be set. When electric power consumption by an accessory included in the adjusting accessory device 190 is being performed up to this time, the accessory control unit 164 stops the electric power consumption, and when electric power consumption is not being performed up to this time, maintains the stopped state without change. Thereafter, the flow advances to step S106.

When advancing to step S105, the boost converter control unit 163 sets the FC boost converter 120 to the minimum boost ratio $Rf_0$. The accessory control unit 164 then causes an accessory included in the adjusting accessory device 190 to execute consumption of electric power, so that the output voltage of the fuel cell 110 falls to $Vb/Rf_0$. Thereafter, the flow advances to step S106.

In step S106, the system control unit 160 confirms whether the vehicle has stopped. When not stopped, the flow returns to step S102 and the series of processing is repeated. When stopped, the series of processing ends.

By performing such processing electric power consumption by accessories can be suppressed in accordance with the state of the fuel cell 110 and the secondary battery 150. Accordingly, a greater amount of electric power of the fuel cell 110 can be allocated to traveling, and thus, the vehicle traveling by the fuel cell system 100 can travel a long distance until the user stops the vehicle, for example.

Figure 7:
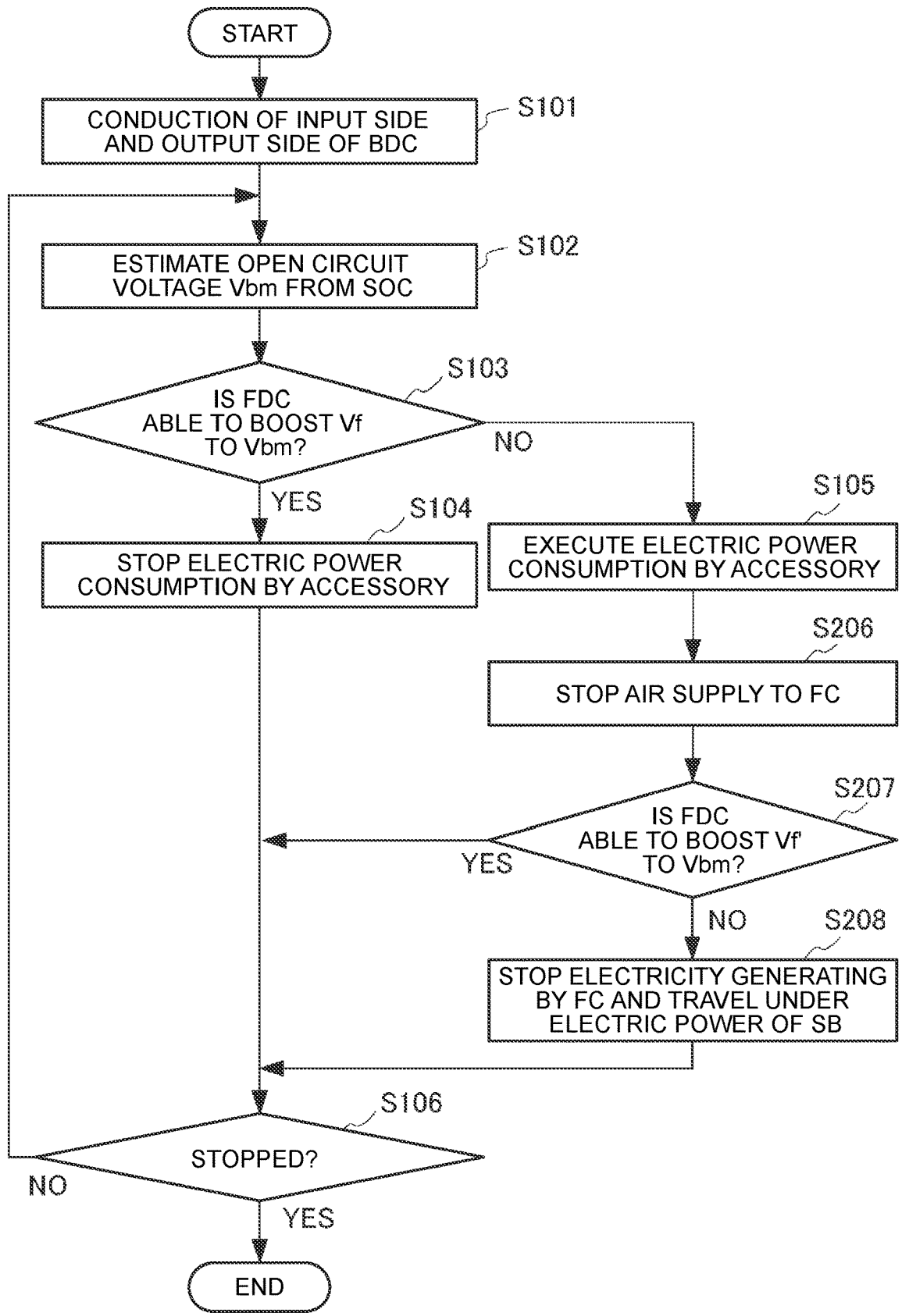
FIG. 7 is a flowchart showing a different example of processing at the system control unit when an abnormality occurs.

Next, a processing flow according to a different example will be described. FIG. 7 is a flowchart showing a different example of processing executed by the system control unit 160 when the SB boost converter 145 fails. The flow shown in FIG. 7 differs from the flow in FIG. 6 with regard to the point that additional processing is added after step S105, and other processing is the same as in the flow in FIG. 6. Accordingly, processing following step S105 will be described in detail.

After the accessory control unit 164 causes an accessory to execute consumption of electric power in step S105, the flow advances to step S206, and the fuel cell control unit 161 stops driving of the air compressor 121 to further lower the output voltage. That is to say, the fuel cell control unit 161 stops supply of air (oxidizing gas) to the fuel cell 110. However, the supply of fuel gas is continued, in order to maintain the operating state of the fuel cell.

After a predetermined amount of time set in advance elapses, the flow advances to step S207. In step S207, the boost converter control unit 163 acquires output voltage Vf of the fuel cell 110 at that point in time, and determines whether the FC boost converter 120 is able to stably boost Vf to Vbm. Specifically, the boost converter control unit 163 determines whether the boost ratio Vbm/Vf is within a boost ratio range in which the FC boost converter 120 is guaranteed to operate. When the boost converter control unit 163 determines that boosting is able to be performed, the flow advances to step S106. When the boost converter control unit 163 determines that boosting is not able to be performed, the flow advances to step S208.

When advancing to step S208, the fuel cell control unit 161 stops supply of fuel gas to the fuel cell 110 as well, and stops the fuel cell 110 from generating electricity. The system control unit 160 drives the traction motor 122 using electric power from the secondary battery 150 to cause the vehicle to travel. Thereafter, the flow advances to step S106. By adding the processing from step S206 through step S208 in this way, both of maintaining the state of the fuel cell generating electricity as long as possible, and stable supply of electric power from the fuel cell system, can be realized.

Although the electric power consumption in step S105 has been described in the present embodiment as being executed by an accessory of the adjusting accessory device 190 that the fuel cell system 100 is provided with, this is not limiting. Other accessories may be used, or an external accessory connected to the fuel cell system 100 may be used. Also, although an arrangement of installing the fuel cell system 100 in a vehicle has been described in the present embodiment, the scope of usage of the fuel cell system 100 is not limited to vehicles. For example, the fuel cell system 100 may be installed in drones, in moving robots, and so forth.

What is claimed is:

1. A fuel cell system provided comprising:
   a fuel cell;
   a secondary battery as electric power supply sources for a load;
   a first boost converter that boosts and outputs output voltage of the fuel cell;
   a second boost converter that boosts and outputs output voltage of the secondary battery; and
   a control unit programmed to control the fuel cell system,
   wherein an output side of the first boost converter and an output side of the second boost converter are connected so as to be the same potential as each other,
   and wherein the control unit is programmed to, when detecting failure of the second boost converter, cause an input side and the output side of the second boost converter to conduct, estimate an open circuit voltage of the secondary battery based on a state of charge, and execute electric power consumption by an accessory that operates by electric power supplied from the fuel cell when determining that the first boost converter is not able to boost the output voltage of the fuel cell to the open circuit voltage of the secondary battery, and stops the electric power consumption by the accessory when determining that the first boost converter is able to boost the output voltage of the fuel cell to the open circuit voltage of the secondary battery.

2. The fuel cell system according to claim 1, wherein the control unit uses the open circuit voltage of the fuel cell as the output voltage of the fuel cell.

3. The fuel cell system according to claim 1, wherein the control unit determines that the first boost converter is not able to boost the output voltage of the fuel cell, when the open circuit voltage of the secondary battery is smaller than a value obtained multiplying the output voltage of the fuel cell by a minimum boost ratio at which operation of the first boost converter is guaranteed.

4. The fuel cell system according to claim 1, wherein the control unit stops supply of air to the fuel cell and continues supply of fuel gas, when determining that the first boost converter is not able to boost the output voltage of the fuel cell to the open circuit voltage of the secondary battery.

5. The fuel cell system according to claim 4, wherein the control unit measures the output voltage of the fuel cell after a predetermined amount of time has elapsed following stopping supply of air to the fuel cell, and stops generating of electricity by the fuel cell, when determining that the first boost converter is not able to boost the output voltage of the fuel cell to the open circuit voltage of the secondary battery.

6. A control method for a fuel cell system provided with a fuel cell and a secondary battery as electric power supply sources for a load, in which output sides of each of a first boost converter that boosts and outputs output voltage of the fuel cell and a second boost converter that boosts and outputs output voltage of the secondary battery are connected so as to be the same potential as each other, the control method comprising:

detecting failure of the second boost converter by a computer,
  causing an input side and the output side of the second boost converter to conduct when detecting the failure of the second boost converter by the computer,
  estimating an open circuit voltage of the secondary battery based on a state of charge by the computer,
  determining whether the first boost converter is able to boost the output voltage of the fuel cell to the open circuit voltage of the secondary battery by the computer,
  executing electric power consumption by an accessory that operates by electric power supplied from the fuel cell when determination is made that the first boost converter is not able to boost the output voltage of the fuel cell to the open circuit voltage of the secondary battery by the computer, and
  stopping the electric power consumption by the accessory when determination is made that the first boost converter is able to boost the output voltage of the fuel cell to the open circuit voltage of the secondary battery by the computer.

7. A non-transitory storage medium storing a control program for a fuel cell system provided with a fuel cell and a secondary battery as electric power supply sources for a load, in which output sides of each of a first boost converter that boosts and outputs output voltage of the fuel cell and a second boost converter that boosts and outputs output voltage of the secondary battery are connected so as to be the same potential as each other, the control program causing a computer to execute:

detecting failure of the second boost converter,
  causing an input side and the output side of the second boost converter to conduct when detecting the failure of the second boost converter,
  estimating an open circuit voltage of the secondary battery based on a state of charge,
  determining whether the first boost converter is able to boost the output voltage of the fuel cell to the open circuit voltage of the secondary battery,
  executing electric power consumption by an accessory that operates by electric power supplied from the fuel cell when determination is made that the first boost converter is not able to boost the output voltage of the fuel cell to the open circuit voltage of the secondary battery, and
  stopping the electric power consumption by the accessory when determination is made that the first boost converter is able to boost the output voltage of the fuel cell to the open circuit voltage of the secondary battery.

* * * * *